(No Model.)

T. SCHNITZLEIN.
Comb.

No. 242,700

Patented June 7, 1881.

Witnesses:—
Louis M. Hohlehead
Fred Haynes

Inventor:—
Theodor Schnitzlein
by his Attorneys
Brown & Brown

UNITED STATES PATENT OFFICE.

THEODOR SCHNITZLEIN, OF HAMBURG, GERMANY.

COMB.

SPECIFICATION forming part of Letters Patent No. 242,700, dated June 7, 1881.

Application filed August 2, 1880. (No model.)

*To all whom it may concern:*

Be it known that I, THEODOR SCHNITZLEIN, of Hamburg, in the Empire of Germany, have invented a certain new and useful Improvement in Combs, of which the following is a specification.

In the combs in common use the teeth are made with either a straight tapered or a convex profile upon opposite sides of the comb. It is desirable, in order to prevent the teeth from breaking off the back, that they should be broad at the base where they are united to the back; and the object of my invention is to enable the teeth to be made narrower for the greater portion of their length, so as to give them the requisite elasticity and reduce the weight of the comb without decreasing the width of the teeth at the base.

To this end my invention consists of a comb in which the back or base and teeth are molded in a single piece or integral, and the teeth are broadened at their junction with the back or base and their opposite edges provided with concave profiles, thereby accomplishing the objects above mentioned, and at the same time materially saving stock, which is of considerable importance where combs are molded of rubber or celluloid.

Figure 2:
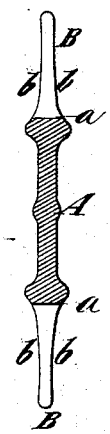
Figure 1:
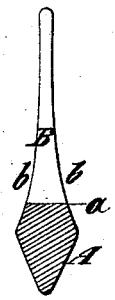

In the accompanying drawings, Figure 1 represents a transverse section of a large comb embodying my invention, and Fig. 2 represents a similar section of a fine comb having teeth upon opposite edges.

Similar letters of reference designate corresponding parts in both figures.

A designates the back of the comb shown in Fig. 1 and the body portion of the comb shown in Fig. 2, and B designates the teeth of the comb.

The back or body of the comb and the teeth are molded in a single piece from rubber or celluloid or other material capable of being molded into the desired form.

The base $a$ of the teeth—that is, the point where they are united to the body or back—is very broad, and hence there is little liability of the teeth being broken off by ordinary usage. As clearly represented, the edges of the teeth which are presented upon opposite sides of the comb are formed with a concave profile, $b$, the teeth tapering gradually from the base toward the points. By giving the teeth this form the teeth are made more slender and more elastic than when they have a straight or convex profile without weakening the teeth by reducing the width of the bases of the teeth or their union or connection with the back or body.

The concave profile of the teeth not only provides a slender form and more elastic quality to the same, but renders it possible to economize in stock, which is of considerable importance where combs are molded from rubber or celluloid.

What I claim as my invention, and desire to secure by Letters Patent, is—

1. A comb having the back or body and the teeth made integral with each other and each tooth formed with concave profiles $b\ b$, which extend longitudinally along the opposite side edges of the tooth, substantially as described.

2. As an improved article of manufacture, a comb molded in a single piece with the back or body A and the tapering solid teeth B, each tooth being broadened at its junction with the body and formed with concave profiles $b\ b$, which extend longitudinally along the opposite side edges of the tooth, all as herein shown and described.

THEODOR SCHNITZLEIN.

Witnesses:
A. SCHAPER,
A. TIMM.